United States Patent Office 2,947,643
Patented Aug. 2, 1960

2,947,643
HYDRAULIC CEMENTS

Jonas Kamlet, % The Kamlet Laboratories, 300 4th Ave., New York 10, N.Y.

No Drawing. Filed Dec. 19, 1955, Ser. No. 553,687

3 Claims. (Cl. 106—97)

This invention relates to hydraulic cements and, more particularly, to the manufacture of hydraulic cements from blast-furnace slags and anhydrite (or gypsum) based on the use of high magnesia content blast-furnace slags. It has for its purpose to provide a process for the utilization of high magnesia content blast-furnace slags in the manufacture of hydraulic cements of excellent stability, suitable for use in the preparation of concretes of good mechanical, compressive and tensile strengths, low heat of hydration and especially good chemical resistance. It has for its further purpose to provide an outlet for the utilization of high magnesia-content blast-furnace slags in the manufacture of hydraulic cements, for which these slags have heretofore been considered completely unsuitable because of their high magnesia content.

Very considerable quantities of blast-furnace slag (a byproduct from the manufacture of pig iron) are used annually throughout the world in the manufacture of Portland cement, Portland blast-furnace cement (also called Portland blast-furnace slag cement), puzzolana cement, Portland trass cement, Eisenportlandzement and Hochofenzement (Germany), ciment de fer, ciment de haut fourneau and ciment de laitier au clinker (France) and similar hydraulic cements.

It has long been known that such hydraulic cements exhibit long term unsoundness if their magnesium oxide content is permitted to exceed 4% to 5%. This is due to the tendency of the MgO to hydrate slowly to form periclase crystals in the cement clinker, and thus exert a disruptive effect on the concrete made therefrom. Thus, standard specifications for these cements, throughout the world limit their MgO content to a maximum of 5%, and usually less.

The increasing use of high-magnesia and dolomitic limestone in the operation of blast-furnaces throughout the world, and other changes in the ore burden and the running of the furnace, largely in order to modify the viscosity, melting range and yields of the by-product slags, has made available very considerable quantities of high-magnesia slags often containing as much as 18% of MgO. These slags have heretofore been completely unsuitable for hydraulic cement manufacture by virtue of their high MgO content. It is the further purpose of this invention to provide a new type of hydraulic cement, based on the use of these high MgO content blast-furnace slags.

In 1908, H. Kuhl (German Patent 237,777) first described a hydraulic cement based on the grinding together of granulated blast-furnace slag, gypsum (or some other form of calcium sulfate) and a small amount of an alkaline activator. This product has been widely described and is now being manufactured and marketed, chiefly in Europe, under the names: "Ciment Sursulfate," "Sealithor," "Bellor," "Cilor," "Supercilor," etc. (Blondiav, Rev. matériaux constructions (1938), pp. 201–7; (1939), pp. 8–11, 26–31, 45–48, 69–76, 89–92, 113–115, 130–133, 153–157, 170–173, 179–182, 196–198, 223–228; Chimie et Industrie, Paris, 1934–1935; Grun and Tiemeyer, Tonindustrie Zeit. 63, 939–40, 946–9 (1939).

This product will hereafter be referred to as "slag-anhydrite" cement. It is very important to distinguish clearly between the general type of slag-anhydrite cement and the hydraulic cements based on blast-furnace slags described in the second paragraph of this specification.

Portland blast-furnace cement, Portland blast-furnace slag cement, Eisenportlandzement, ciment de fer, ciment de haut fourneau and ciment de laitier au clinker all contain less than 65% of blast-furnace slag, with no gypsum or calcium sulfate and the remainder of the cement being Portland cement clinker. Hochofenzement contains 31%–85% of blast-furnace slag, 15%–69% of Portland cement clinker and no gypsum or calcium sulfate.

Slag-anhydrite cement have heretofore contained at least 80% of water-granulated blast-furnace slag, a small amount (usually less than 2%) of an alkaline activating agent (such as lime, Portland cement clinker), with the remainder of the cement comprising anhydrite, gypsum or some other form of calcium sulfate.

It has heretofore been stated and held that high MgO-content blast-furnace slags are not suitable for the manufacture of slag-anhydrite hydraulic cements as they are similarly not suitable for the manufacture of the previously described hydraulic cements. Thus, Guttmann (Die Verwendung der Hochofenschlacke, Verlag Stahleisen (1934), p. 462), a recognized authority in this field, states that a high MgO content in the slag makes it unsuitable for slag-anhydrite cement manufacture. Dubuisson (Revue des matériaux de construction et de travaux publics, C 1950, #412, pp. 9–15, January) and Budnikov and Kosyreva (Comptes rendus a l'Academie des Sciences de l'URSS 65, #5,735–738 (1949) indicate that only limited amounts of MgO are permissible. Grun (Der Hochofenschlacke in der Zementindustrie, Verlag Stahleisen, 1942, vol. 62, pp. 307–310) ascribes unsoundness in slag-anhydrite cements to a high MgO content and advises the use of a low MgO content slag. In the authoritative text on blast-furnace slag by Fritz Keil (Hochofenschlacke, Verlag Stahleisen, 1949, page 70, the heretofore permissible ranges for the MgO content of blast-furnace slags suitable for use in the manufacture of slag-anhydrite cements is given as 1.8% to 4.3%, (pp. 69–70). "Sealithor," a widely used slag-anhydrite cement, has an MgO content of 2.61%. Stutterham and Nurse (q.v. supra) state: "Most authors agree that high magnesia slags are unsuitable for the manufacture of supersulfate (slag-anhydrite) cement."

With increasing availability of slags derived from high-magnesia and dolomitic limestone blast-furnace burdens, more and more of the huge quantities of slag made annually throughout the world, and especially in the United States, are rendered unsuitable for use in the manufacture of slag-anhydrite hydraulic cements by virtue of an MgO content in excess of 4.3% which has been shown heretofore to be the highest MgO content tolerable in slags used for this purpose.

The reason for the unsuitability heretofore of slags containing more than 4.3% of MgO may be explained on the following basis. Early strength in slag-anhydrite cements is due almost entirely to the reaction of the lime, alumina and calcium sulfate components to form tricalcium sulfoaluminate $(3CaO.Al_2O_3.3CaSO_4.31H_2O)$. This formation supersedes and occurs in preference to any other until all of the component present in lowest stoichiometric amount is used up. In this case, it is the $CaSO_4$ which is present in lowest stoichiometric amount. Thus, tricalcium sulfoaluminate formation proceeds until all of the calcium sulfate is substantially consumed.

After all of the $CaSO_4$ has been used up, the remaining calcium silicates and calcium aluminates react, as in the case of ordinary Portland cement, to give the long-time and possibly the fundamental strength of the cement.

Unsoundness in those cements based on Portland cement clinker and slag, when attributable to a high MgO content in the slag, is due to the formation of a spinel ($MgO.Al_2O_3$ or $MgO.Fe_2O_3$). (Zement 25, 861–5, 879–82 (1936).)

In slag-anhydrite cements, I have found that the magnesium oxide will react with the alumina of the slag and the $CaSO_4$ of the anhydrite or gypsum to produce a trimagnesium sulfoaluminate, believed to be isomorphic with tricalcium sulfoaluminate and to have the structure $3MgO.Al_2O_3.3CaSO_4.31H_2O$. However, this formation is much more slowly accomplished than in the case of the tricalcium sulfoaluminate, and results in a lower early strength in slag-anhydrite cements made with high MgO slags. Similarly, it is believed that this lesser reactivity of the MgO may result in the presence of uncombined MgO in the cement after setting. Recrystallization of the original tricalcium sulfoaluminate, due to slow reaction with the MgO, in the form of the magnesium isomorph, may also account for the unsoundness of slag-anhydrite cements heretofore made with high MgO slags. I do not, however, in any way wish to limit the scope of this invention by the validity of this explanation. The theory of hydraulic cements in general and slag-anhydrite cements in particular is by no means entirely clear. Other possible valid explanations may occur to any person skilled in the art.

The basis of my invention is the finding that it is entirely feasible to employ water-granulated blast-furnace slags in the manufacture of slag-anhydrite cements, with these slags containing in excess of the heretofore permissible maximum of 4.3% MgO, but not more than 12.5% of MgO, provided that the finished cement is ground to a fineness in excess of 4000 square centimeter per gram, as measured by the Blaine air permeability method. For practical purposes, the limiting finenesses may be given as 4000 to 10,000 sq. cms. per gram (Blaine). By grinding the finished cements to this fineness, the delay in early strength formation is minimized and no long term unsoundness develops. The larger surface exposed to chemical reaction by this grinding more than compensates for the lower reactivity of the MgO. It thus becomes feasible for the first time to use slags with 4.3% to 12.5% of MgO in the manufacture of sound slag anhydrite cements.

In some plants, the Wagner turbidometric method is used to measure the fineness of cement grind. The Blaine fineness divided by a specific factor (usually 1.64 to 1.76) and multiplied by the percentage of the cement passing a No. 325 sieve gives a very close approximation of the Wagner fineness, i.e.

$$\frac{\text{Blaine fineness}}{\text{Wagner fineness}} \times \text{percent through No. 325 sieve}$$

$$= 1.64 \text{ to } 1.76$$

It has heretofore never been shown that it is possible to compensate for the lower reactivity of high MgO blast-furnace slags, in the setting process, by increasing the fineness of grind of the finished cement, and thus increase the total surface exposed to chemical interaction. By this simple means, it now becomes possible to employ by far the greatest proportion of high-magnesia blast-furnace slags derived throughout the world, in the manufacture of slag-anhydrite cements, whereas previously these slags had been completely unsuitable for this purpose.

I have found that such cements made from slags containing 4.3% to 12.5% of MgO, when ground to a fineness of from 4000 to 10,000 sq. cm./gram (Blaine) show excellent long terms stability and soundness. However, with slags containing in excess of 12.5% of MgO, instability and unsoundness develop in the finished cements after some time, even when ground to within the indicated fineness range.

An analysis of 120 high-magnesia blast-furnace slags produced in the United States and abroad, indicates that 112 of these slags contain MgO within the range of 4.3% to 12.5% which I have found suitable for use in my invention. Only eight of these slags contain from 12.5% to 17.9% of MgO. Thus, my invention provides an outlet for not all but by far the greatest amount of high-magnesia blast-furnace slags obtained throughout the world in slag-anhydrite cement manufacture, all of which high-magnesia slag had heretofore been completely unsuitable for this purpose.

The basis of the slag anhydrite cements of the present invention is the mixing of:

(a) 75.0% to 92.5% of a high glassy phase blast-furnace slag assaying from 4.3% to 12.5% of magnesium oxide, (b) 0.1% to 4.0% of an alkaline activator chosen from the group consisting of calcium oxide, calcium hydroxide and Portland cement, and (c) The remainder consisting of at least one member of the group consisting of anhydrite, gypsum and calcium sulfate, and grinding the components separately or together to a cement fineness of from 4000 to 10,000 sq. cm. per gram as measured by the Blaine air permeability method.

Mortars and concretes made with the new slag anhydrite cements of this invention show mechanical, tensile and compressive strengths exceeding those of Portland cements, satisfactory initial and final setting times, satisfactory early strength development, excellent long term stability and soundness and excellent chemical resistance. The high resistance of these products to aggressive waters makes them particularly suitable for use in the constructions of dams, cisterns, pipes, wells, breakwaters, sewers, all types of hydraulic works and wherever corrosion or abrasion is marked.

It is interesting to note that it is precisely the chemical mechanism which makes Portland cement weaken in the presence of sulfate ion (e.g. in aggressive ground waters), that makes the slag-anhydrite cements of my invention resistant to such degradative action. As previously explained, the development of early strength in the slag-anhydrite cements is attributable to the formation of tricalcium sulfoaluminate and the isomorphic trimagnesium sulfoaluminate. However, it is precisely this formation of tricalcium sulfoaluminate (by the interaction of Portland cement components with sulfate ions) and the recrystallization of the product which is considered to be the disruptive or disintegrative cause in Portland cement concretes. In other words, and at the risk of oversimplification, I believe that the cause of weakness of Portland cement in the presence of sulfate ions is the source of strength of slag-anhydrite cements under the same conditions.

When blast-furnace slag is tapped, it flows from the furnace as a homogeneous molten glass. The rapid chilling or quenching of this slag with water is essential in order to prevent the formation and growth of crystal nuclei. The higher the glassy phase content of water-granulated blast-furnace slag, the less is the loss of internal or latent energy through crystallization, and the greater is its hydraulic potential, i.e. its suitability for use in the manufacture of hydraulic cements and the slag-anhydrite cements of my invention. The hydraulic value of the cement produced is a direct function of the glassy phase content of the slag. When properly granulated slag is powdered and examined with a petrographic microscope by transmitted light under crossed Nicol prisms, the grams show up as an isotropic transparent glass, with some black or brown areas of incipient crystallization. A glassy phase content in excess of 80% of the slag is usually desirable in the manufacture of the slag-anhydrite cements of my invention.

The following examples are given to define and to illustrate this invention but in no way to limit it to reagents, proportions or conditions described therein. Obvious modifications will occur to any person skilled in the art.

Examples

Five blast-furnace slags were quenched in the molten state by running directly into a pit of cold water. The granulated slags were dried and ground to about 60 mesh fineness. These slags contained 85%–95% of glassy phase with some crystalline inclusions. Their MgO contents varied as follows:

| Slag | A | B | C | D | E |
|---|---|---|---|---|---|
| MgO _____percent__ | 4.42 | 6.78 | 8.82 | 11.21 | 12.38 |

Each slag was then employed in each of the following formulations:

| Formulation | I | II | III | IV | V |
|---|---|---|---|---|---|
| Percent Slag | 75.0 | 80.0 | 84.5 | 90.0 | 92.5 |
| Percent Activator | 1.0 Ca-(OH)$_2$ | 1.0 CaO. | 0.5 CaO. | 3.0 Portland Cement. | 0.5 CaO. |
| Percent Anhydrite (Insoluble) | 24.0 | 15.4 | 9.0 | 7.0 | |
| Percent Gypsum | | 3.6 | 6.0 | | 7.0 |

Each formulation was then ground to a fineness between 4000 and 10,000 sq. cm. per gram (Blaine) and tested for mortar compressive strength on the basis of five sacks of cement per cubic yard of mortar.

| Formulation | Motor Compressive Strengths (lbs. per square inch) | | | Fineness (Sq. cm. per gram Blaine) |
|---|---|---|---|---|
| | 3 day | 7 day | 28 day | |
| Type I Portland Cement | 1,400 | 1,950 | 3,050 | 3,250 |
| A-I | 1,350 | 1,850 | 3,150 | 4,200 |
| A-II | 1,450 | 2,000 | 3,450 | 6,500 |
| A-III | 1,600 | 2,150 | 3,350 | 7,000 |
| A-IV | 1,750 | 2,250 | 3,600 | 8,500 |
| A-V | 1,450 | 2,000 | 3,100 | 9,500 |
| B-I | 1,500 | 2,050 | 3,200 | 8,000 |
| B-II | 1,450 | 2,200 | 3,300 | 9,550 |
| B-III | 1,300 | 2,400 | 3,350 | 4,500 |
| B-IV | 1,350 | 2,350 | 3,300 | 6,500 |
| B-V | 1,600 | 2,200 | 3,850 | 7,000 |
| C-I | 2,250 | 3,150 | 4,150 | 4,200 |
| C-II | 2,300 | 3,200 | 4,300 | 4,400 |
| C-III | 1,950 | 2,250 | 3,850 | 7,500 |
| C-IV | 2,000 | 2,450 | 3,950 | 8,000 |
| C-V | 2,250 | 3,650 | 4,050 | 9,500 |
| D-I | 1,700 | 2,000 | 3,150 | 5,500 |
| D-II | 1,650 | 2,150 | 3,250 | 6,000 |
| D-III | 1,550 | 2,400 | 3,600 | 4,500 |
| D-IV | 1,450 | 2,250 | 4,000 | 9,500 |
| D-V | 1,350 | 1,950 | 3,650 | 8,500 |
| E-I | 1,600 | 2,050 | 3,050 | 6,000 |
| E-II | 1,700 | 2,400 | 3,150 | 6,000 |
| E-III | 1,550 | 2,450 | 3,200 | 5,350 |
| E-IV | 1,750 | 2,450 | 3,800 | 4,350 |
| E-V | 1,800 | 2,600 | 3,950 | 4,450 |

Each of these cements showed excellent long term stability and soundness, a low heat of hydration (about half that of Portland cement), satisfactory autoclave expansion and curing characteristics and is eminently suitable for all types of concrete work.

Having described my invention, what I claim and desire to protect by Letters Patent is:

1. Hydraulic cements containing:
   (a) from 75.0% to 92.5% of water-granulated blast-furnace slag assaying from 4.3% to 12.5% of magnesium oxide content,
   (b) from 0.1% to 4.0% of an alkaline activator chosen from the group consisting of calcium oxide, calcium hydroxide and Portland cement,
   (c) the remainder containing at least one member of the group consisting of anhydrite, gypsum and calcium sulfate,
the cement being ground to a fineness of from 4000 to 10,000 square centimeters per gram by the Blaine air permeability method.

2. Hydraulic cements as described in claim 1 prepared from blast-furnace slags assaying from 4.3% to 12.5% of magnesium oxide content, said slags having previously been granulated by admixing the molten slag with water to obtain a high content of glassy phase in the solidified material.

3. Hydraulic cements as described in claim 1 prepared from water-granulated blast-furnace slags assaying from 4.3% to 12.5% of magnesium oxide content, said slags consisting of at least 80% of glassy phase.

References Cited in the file of this patent

UNITED STATES PATENTS

| 983,024 | Bruhn | Jan. 31, 1911 |
|---|---|---|
| 1,462,991 | Taylor | July 24, 1923 |
| 1,834,799 | Nickel et al. | Dec. 1, 1931 |
| 2,116,469 | Karwat | May 3, 1938 |
| 2,458,039 | Wait | Jan. 4, 1949 |
| 2,752,261 | Dournaud | June 26, 1956 |

FOREIGN PATENTS

| 264,711 | Great Britain | Jan. 27, 1927 |
|---|---|---|
| 464,917 | Great Britain | Apr. 27, 1937 |

OTHER REFERENCES

Calcareous Cements (1905), pages 241, 246, by Redgrave.